United States Patent Office 3,672,831
Patented June 27, 1972

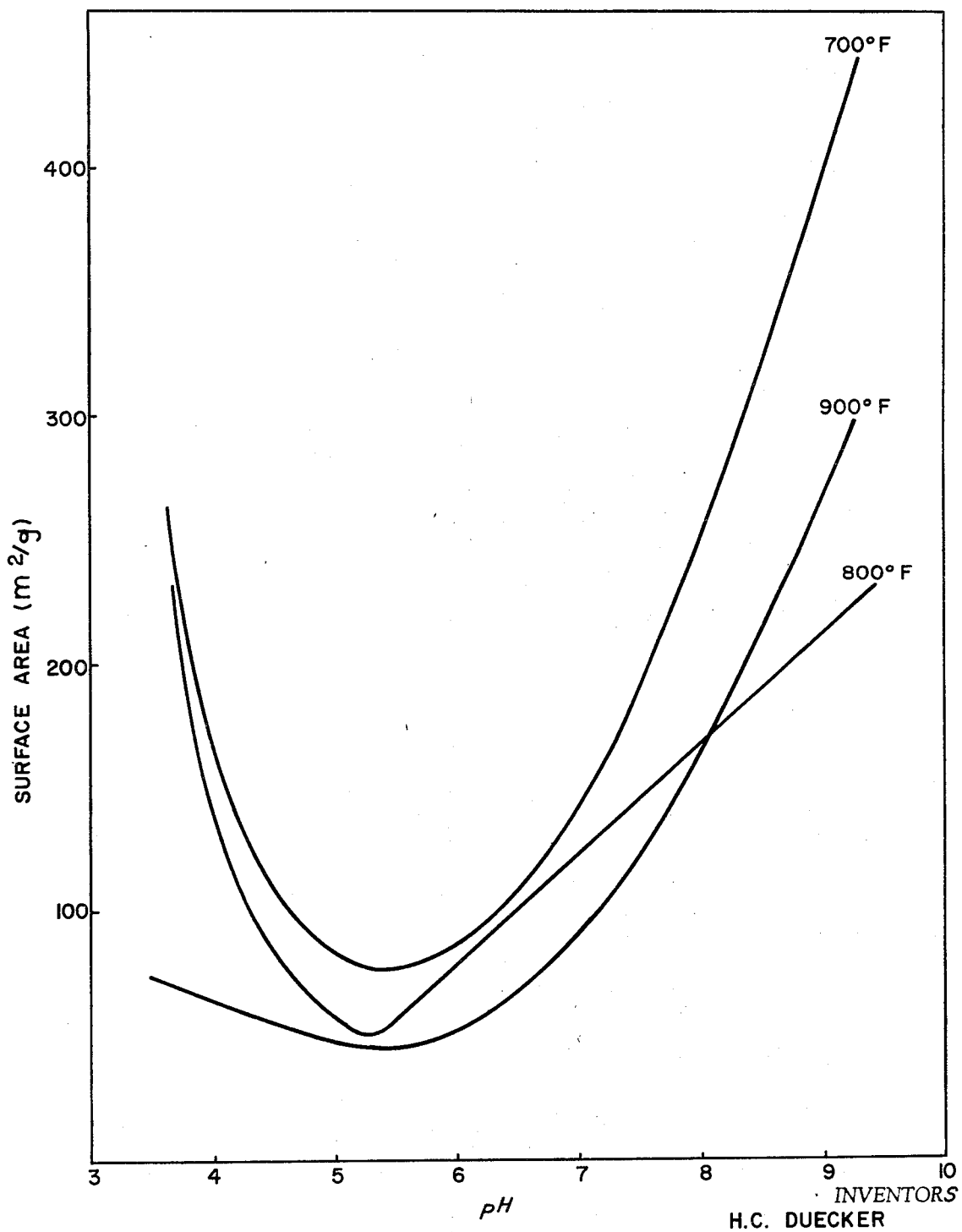

3,672,831
PROCESS FOR THE PREPARATION OF FINE-SIZED ALUMINAS
Heyman C. Duecker, 10097 Colonial Drive, Ellicott City, Md. 21043, and Rimantas Glemza, 6105 Burnt Oak Road, Baltimore, Md. 21228
Continuation-in-part of application Ser. No. 645,231, June 12, 1967. This application Oct. 8, 1969, Ser. No. 868,275
Int. Cl. C01s 7/30
U.S. Cl. 23—143
4 Claims

ABSTRACT OF THE DISCLOSURE

A process for the preparation of sub-micron sized alumina powders by the thermal decomposition and/or dehydration of those aluminum compounds which on heating under carefully controlled conditions will yield the oxide.

---

Figure 1:
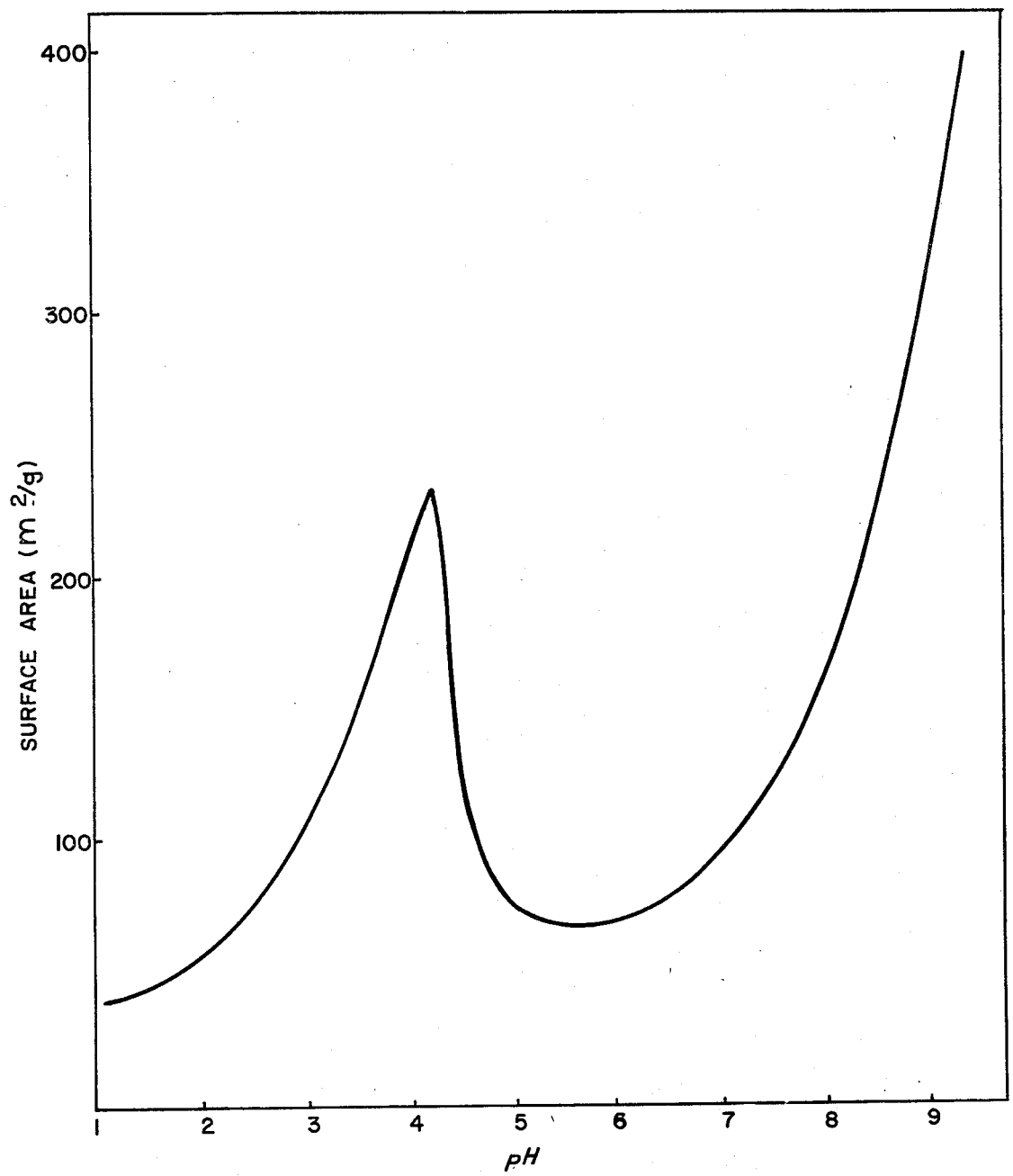

This application is a continuation-in-part of application Ser. No. 645,231, filed June 12, 1967, now abandoned.

This application relates to a process for the preparation of sub-micron sized alumina powders having purities in excess of 99.5% and surface areas in excess of 5 square meters per gram. In one specific aspect, it relates to the preparation of these aluminas by fluid energy milling aluminum nitrate, aluminum formate, aluminum acetate, aluminum chloride, etc. as the solid, solutions or slurries. These salts or salts with higher decomposition temperatures such as the sulfate, for example, may have been neutralized with ammonia prior to treatment in the fluid energy mill. The mill is operated at a temperature of 500 to 1200° F., preferaby about 700 to 1050° F. The product recovered is essentially sodium free and has a surface area in excess of 5 square meters per gram and a particle size in the 0.02 to 2 micron size range.

Ceramics are normally formed at temperatures in excess of 1200° C. These temperatures convert all phases of alumina to alpha alumina and result in undesirable particle growth. Our novel process can be used to prepare fine-sized alumina powders that have an additional advantage in ceramic applications. The particle size is in the sub-micron to lower micron size range, thus these particles can be used to prepare final bodies having improved strength characteristics.

Our process can also be used to prepare aluminas having a density close to theoretical after calcination, at lower calcination temperatures than were previously possible. Our alumina products are in the sub-micron to lower micron (0.02 to 2 micron) size range. This property makes them particularly attractive as pigments and additives since these applications require the products to have a very small particle size.

The majority of catalytic reactions are carried out at temperatures below the temperature at which gamma alumina is converted to alpha alumina. However, most of these reactions are carried out at temperatures high enough to crystallize amorphous alumina. Gamma type aluminas with a surface area in excess of 200 square meters per gram can be prepared by our process. These products are particularly suitable as catalyst bases.

In our novel process, alumina precursors are subjected to rapid high temperature drying and/or decomposition in equipment such as a fluid energy mill. Fast dehydration and/or decomposition under minimal temperature gradients is necessary to achieve fine particles, to achieve the desired alumina phase and to eliminate washing steps where this may be desirable or necessary.

Our process is preferably carried out in a fluid energy mill which is a standard article of commerce. Commercially available mills are designed to operate at temperatures in the range of 500–1200° F., however they can be modified to operate at temperatures high enough to effect the decomposition of the more thermally stable alumina precursors such as aluminum sulfate for example. This decomposition would require redesign of the mill to operate at temperatures above the 1200° F. range.

The feed used to prepare our aluminas can be characterized by the general formula:

$$Al_2O_3 : xHa : yH_2O$$

where Ha is the acid used to prepare the salt decomposable at the temperature of operation of the fluid energy mill, $x$ may have a value of 0 to 10 and $y$ a value of 0 up to about 1000. When $x$ has a value of 3 or greater than 3, examples of suitable acid salts, decomposable in the preferred range of operation of the mill (500–1200° F.) include aluminum nitrate, aluminum formate, aluminum acetate, aluminum chloride, aluminum oxalate, etc.

It is obvious, however, that a fluid energy mill, modified to operate at temperatures above about 1200° F. would be capable of decomposing salts that decompose at temperatures above 1200° F. such as aluminum sulfate, for example.

$y$ may have any value from 0 to up to about 1000 depending on the physical state of the decomposable aluminum source. When the feed is a solution, $y$ has a value of up to 1000. When the feed is a solid, $y$ has a value of 1 to 10. The fluid for operation of the mill can be nonreactive low molecular weight gas such as water vapor, carbon dioxide or air, for example.

When the value of $x$ is 0 and $y$ is small (less than 4), the feed is obviously alumina hydrate or hydrogel. We can recover alumina powders having the properties outlined above and a particle size in the sub-micron to low micron size range by feeding the unwashed gel to the mill. This is obviously advantageous in that our process eliminates the washing steps normally required in the preparation of aluminas by decomposition of the hydrous oxide gels.

In the drawings:
FIG. 1 is a graph showing the relationship of the surface area of the product to the pH of the precursor.
FIG. 2 gives a graph showing the surface area as a function of pH when the raw material is fed to a mill operated at 700, 800, and 900° F., respectively.

Although it is obvious that salts other than the aluminum nitrate can be used in preparing our alumina products, for purposes of simplicity, our novel process will be described using aluminum nitrate as the starting material.

The feed for the mill may be prepared by:
(1) Neutralization of the aluminum nitrate solution with ammonium hydroxide or ammonia gas;
(2) Acidification of aluminum nitrate solution with nitric acid;
(3) Preparation of aluminum nitrate solution, or
(4) The aluminum nitrate may be fed to the mill as a powder.

The properties of the product vary with the operating temperature of the mill and the pH ranges in which the feed is decomposed or dehydrated in the fluid energy mill. The feed may be milled as a solution, slurry, paste, or partially dewatered solid. No effort is made in any of these methods to separate and wash any of the precipitates formed. When a solution of the aluminum salt (aluminum nitrate or aluminum sulfate, for example) is neutralized with ammonium hydroxide or ammonia gas, the resulting slurry can be fed to the mill without any attempt being made to recover the aluminum hydroxide precipitate and to wash the precipitate.

Another satisfactory feed is aluminum nitrate nonahydrate, which can be fed to the mill directly as the powder or as a solution or slurry of the powder.

When the feed is a hydrated alumina, it may, if desired, be mixed with solid ammonium nitrate or slurried with ammonium nitrate solutions. Milling mixtures of the hydrate with ammonium nitrate yields aluminas having different physical properties than those milled without ammonium nitrate. The choice of the physical state of the feed material is dictated by the physical and chemical properties of the crystalline phase and the crystalline phase desired in the final powder.

When a solution is used as a feed, the concentration of the aluminum salt solution depends on the final product desired. Satisfactory results have been obtained using solutions having salt concentrations between about 5 to 35 weight percent to preferably 3 to 15 weight percent.

When the feed is a slurry of aluminum salt that has been treated with ammonia, control of pH is also an important feature of our process. The physical properties and crystal structure of the product depend on the pH of slurry fed to the mill. Satisfactory products are recovered when the pH of the feed is adjusted from a pH of about 1.0 to 10.

The effect of pH adjustment on the surface area of the product is shown in FIG. 1. The surface area goes through a maximum when the aluminum nitrate solution is neutralized to a pH of about 4.0 to 4.5. The surface area drops rapidly when the pH is increased from 5 to 6.5 and rises again at a pH of 9 to 9.5.

The rate of feed of the slurries, solutions, or gels to the mill is, of course, dependent on physical characteristics of the feed. When the solution is fed to an 8" fluid energy mill, using steam or air as the milling medium, for example, it is conveniently fed at a rate of 50 to 300 ml. per minute, preferably about 120 to 220 ml. per minute. Solids, on the other hand, can be fed at a rate of 50 to 300 grams per minute, preferably about 100 to 200 grams per minute.

One of the principal advantages of the process of our invention resides in the fact that the alumina, as prepared, can be sintered to high density at temperatures several hundred degrees lower than is required when the alumina is prepared by other processes. The calcination temperature, of course, depends on whether gamma or alpha alumina is being prepared. Very frequently, the product recovered from the process contains a crystalline phase in a concentration of about 20 to 30% with the balance of the product being amorphous.

Our invention is further illustrated by the following specific but non-limiting examples.

EXAMPLE 1

An aluminum nitrate solution was prepared to contain 80% by weight aluminum nitrate. A sufficient quantity of 4 percent ammonium hydroxide solution was added to adjust the pH of the slurry to about 9. The slurry was dewatered by filtration and the wet cake dried at room temperature to yield a product containing 17 percent alumina and 31 percent ammonium nitrate. The solid was fed to a fluid energy mill operated at approximately 800° F. An amorphous alumina product was obtained containing 16 percent water and 0.8 percent ammonium nitrate.

EXAMPLE 2

An aluminum nitrate solution was prepared to contain 28 percent by weight of aluminum nitrate. The solution was heated and neutralized with sufficient amount of 15 percent ammonia solution to yield a slurry having a pH of 5 to 6. The reaction was carried out at a temperature of about 60° C. in a conventional reactor. A slurry containing 4.7 percent alumina and 22 percent ammonia was recovered from the reactor and aged for about 8 hours at 40 to 60° C. The slurry was fed to a high temperature fluid energy mill operated at 800° F. at rates such that 1 pound of product was recovered per hour. The run was carried out until 50 pounds of product was recovered. The product was an alpha alumina containing 15 percent water and 0.9 percent ammonium nitrate.

EXAMPLE 3

A series of slurries were prepared using the techniques described in Examples 1 and 2 and milled at various temperatures. The effect of pH, aging and concentration were varied along with the feed rate, exit temperature and grind pressure in the mill. The products recovered were analyzed. The total volatiles electrolyte content, surface area and crystal phase were determined. The results of some runs on this is shown in Table I.

TABLE I

| | Precipitation | | Phases detectable by— | | Total volatiles (weight percent) after 8 hours at 1650° F. | Weight percent $NH_4NO_3$ |
|---|---|---|---|---|---|---|
| | pH of feed | Percent $Al_2O_3$ in feed | X-ray after 1 hour at 800° F. | Surface area | | |
| Run No.:[1] | | | | | | |
| I | 5.7 | 3.1 | Alpha | 90 | 13.0 | 0.8 |
| II | 9.3 | 2.8 | Alpha and gamma | 195 | 12.0 | 2.6 |
| III | 5.6 | 4.5 | Amorphous | 220 | 28.4 | 7.0 |
| IV | 9.2 | 5.5 | Alpha and gamma | 250 | 31.6 | 20. |
| Run No.:[2] | | | | | | |
| V | 5.7 | 3.1 | Alpha | 105 | 9.5 | 1.5 |
| VI | 9.3 | 2.8 | Alpha and gamma | 230 | 10.3 | 7.0 |
| VII | 5.6 | 4.5 | Alpha | 125 | 15.4 | 1.6 |
| VIII | 9.2 | 5.5 | Gamma | 285 | 18.8 | 5.1 |

[1] In this series of runs, the feed was aged at 60° C. for 2 hours, the slurry was fed to a mill operated at an outlet temperature of 800° F. at a rate of 150 cc./min.
[2] In this series, the feed was aged for greater than 20 hours at 60° C., the slurry was fed to a mill operated at an outlet temperature of 800° F. at a rate of 150 cc./min.

The surface area and X-ray determinations were made after the sample was activated at 800° F. for a period of 1 hour.

The data presented in Table I shows the variations in the physical properties of the product that are obtainable by use of our process. It is apparent from these data that amorphous alumina or a mixture of alpha and gamma alumina can be prepared by control of the pH of the feed and percent of aluminum salt in the feed.

EXAMPLE 4

A series of runs were completed to determine the effect of ammonia gas concentration in preparations where aluminum nitrate was neutralized with ammonia gas. In each of these runs, the slurry was fed to a mill operating at 800° F. at a rate of 150 ml. per minute. Aluminum nitrate solutions containing from 5 to 7.2 percent aluminum (as $Al_2O_3$) were prepared. Ammonia gas in an air stream was bubbled through the aluminum nitrate solution with virgorous stirring. Stoichiometric neutralization was achieved after about 5 hours. The data collected in this series of runs is shown in Table II below:

TABLE II

Aluminas prepared by NH₃ gas neutralization of Al(NO₃)₃ solution

| Run | Conditions of precipitation | | | S.A. in m.²/g. | Total volatiles after heating at 900° C. | Weight percent NH₄NO₃ in product | Phases detected by X-ray after heating 1 hr. at 800° F. |
|---|---|---|---|---|---|---|---|
| | pH | Percent Al₂O₃ | NH₃ mole ratio | | | | |
| I | 1.4 | 7.2 | 0 | 33 | 15.1 | 1.0 | Alpha.[1] |
| II | 1.1 | 5.2 | ²0 | 41 | 13.6 | 0.7 | Alpha and gamma.[1] |
| III | 2.0 | 5.2 | 0 | 63 | 14.1 | 0.8 | Amorphous. |
| IV | 2.6 | 5.1 | 1.5 | 73 | 13.5 | 1.6 | Alpha. |
| V | {4, 4.5} | 5.3 | 3 | 235 | 35.7 | 19 | Alpha and gamma.[1] |
| VI | 5.0 | 5.2 | 3 | 75 | 9.6 | 1.4 | Alpha. |
| VII | {6.5, 7.0} | 5.2 | 3 | 85 | 10.0 | 0.6 | Do. |
| VIII | {9, 9.5} | 5.0 | 6 | 364 | 23.5 | 4.8 | Do. |

[1] Very small peaks.
[2] NHO₃ added.

In runs I, II, and III no ammonia was added. In run II, the pH was adjusted with nitric acid. It is apparent from the data collected in runs IV through VIII that the surface area of the product goes through a maximum at a pH of 4 to 4.5. This is a fairly sharp peak that drops off rapidly to pH's of 5 to 6.5 and then rises. The maximum surface area was obtained when sufficient ammonia gas was added to increase the pH of the slurry fed to the mill to 9 to 9.5. This data is shown graphically in FIG. 1.

EXAMPLE 5

In this example, the effect of temperature on the X-ray pattern and the amount of ammonium nitrate recovered was demonstrated. In each of these runs, the slurry was fed to a fluid energy mill operated at 700, 800, and 900° F. The pH was varied from 3.7 to 9.2. The effect of this treatment on the X-ray pattern is shown in Table III.

TABLE III

Phases detected by X-ray diffraction

| pH: | 700 | 800 | 900 |
|---|---|---|---|
| 3.7 | Amorphous | Alpha and gamma | Alpha. |
| 5.3 | do | Alpha | Do. |
| 7.3 | Alpha | Alpha and gamma | Do. |
| 9.2 | Gamma | do | Gamma. |

It is apparent from these data that increasing the temperature of operation of the high temperature fluid energy mill from 700 to 900° F. converts the product from the amorphous to the alpha alumina when the product is neutralized to a pH of 3.7. When the product is neutralized at a pH of 9.2, at least some gamma alumina is recovered in all cases.

In the second of these runs, the weight percent of ammonium nitrate in the residue was studied as a function of temperature of operation of the high temperature fluid energy mill.

TABLE IV

Percent of electrolytes in terms of weight percent NH₄NO₃

| pH: | Mill temperature, ° F. | | |
|---|---|---|---|
| | 700 | 800 | 900 |
| 3.7 | 10 | 5 | 0.3 |
| 5.3 | 4 | 1.5 | 0.5 |
| 7.3 | 2 | 1.5 | 0.2 |
| 9.2 | 30 | 1 | 1 |

As would be expected, the amount of ammonium nitrate in the product decreases with increasing temperature between pH's of 3.7 and 7.3. However, when sufficient ammonia is added to increase the pH to 9.2, 1 percent residual ammonium nitrate remains in the product, even after milling, at temperatures as high as 900° F. These data are presented graphically in FIG. 2.

EXAMPLE 6

Two runs were completed in which aluminum nitrate (Al(NO₃)₃·9H₂O) was milled directly at 800° F. The mill was operated at a rate such that 2½ pounds of product was recovered per hour. The product was analyzed and found to have the X-ray diffraction pattern of alpha alumina. It contained 12 percent water and 0.5 percent unreacted aluminum nitrate.

This run shows the advantage of our novel process in that it affords a method of preparing alpha alumina. The result obtained is unexpected since when aluminum nitrate Al(NO₃)₃·9H₂O is heated in a crucible, the product recovered is gamma alumina.

In the second run of this series, the aluminum nitrate hydrate used in the experiments described in run I above was treated with 3 times the stoichiometric quantity of ammonia gas. The resulting product was fed to a high temperature fluid energy mill operated at 800° F. at a rate of 150 g./min. The product was gamma alumina with a surface area of 300 m.²/g.

EXAMPLE 7

The flexibility of our novel process was demonstrated by substituting aluminum sulfate for aluminum nitrate in the process. In this run, 15 pounds of aluminum sulfate (Al₂(SO₄)₃·18H₂O) were dissolved in 2½ gallons of water with stirring. The resulting slurry had a pH of 7.5 and contained 3.8 percent alumina by weight. The slurry was fed to a high temperature fluid energy mill operated at 900° F. at a feed rate of 120 cc./min. The product was a mixture of aluminum and ammonium sulfates. It was calcined for 1650° F. for 3 hours to yield gamma alumina with a surface area of 180 m.²/g. It is apparent from these data that gamma alumina with a surface area of about 200 m.²/g. can be prepared from aluminum sulfate solution.

EXAMPLE 8

In this example, a mixture of dried hydrous alumina, containing ammonium nitrate and water, similar to the dewatered product of Example 1 was prepared. The effect of washing was studied by splitting the sample in two portions—one portion was washed free of ammonium nitrate and dried—the other portion was fed to a fluid energy mill without further treatment. Both portions were fed to a mill at operated temperature of 880° F. at a rate of 150 gm. per minute. The unwashed material yielded alpha alumina, while the washed counterpart was gamma alumina.

It is apparent from these data that our process is extremely flexible and that either alpha or gamma alumina can be prepared by careful control of the operating conditions.

EXAMPLE 9

The effect of adding ammonium nitrate was demonstrated by milling a commercially available alumina trihydrate (Al₂O₃·3H₂O) at 830° F.

A quantity of the alumina trihydrate was milled at 830° F. to give a product, which on slurrying with water, yielded a clear mother liquor after being allowed to stand for 15 hours at room temperature.

In a second run in this series, the alumina trihydrate was mixed with 20 percent by weight of ammonium nitrate. This mixture was milled at 830° F. The milled product was slurried with water and allowed to stand for 15 hours at room temperature. The mother liquor was still cloudy, but could be clarified by the addition of ammonium nitrate.

This series of runs shows that milling of alumina trihydrate with ammonium nitrate yields smaller particles than milling without the salt.

What is claimed is:

1. A process for preparing alumina having a controlled particle size, within the range of 0.2 to 2 microns, a controlled surface area and controlled crystal phase which comprises preparing a slurry or solution of an aluminum salt selected from the group consisting of aluminum nitrate, aluminum oxalate, aluminum formate, aluminum acetate and aluminum chloride, adjusting the pH of said slurry or solution within a range of about 3.7 to 9.2, decomposing said slurry or solution in the presence of a gaseous medium in a fluid energy mill operated at a temperature of 500 to 1200° F. and recovering the alumina product.

2. The process according to claim 1 wherein the aluminum salt is aluminum nitrate and is fed to the mill as an aqueous solution, containing 5 to 15 percent by weight of said salt.

3. The process according to claim 1 wherein the gaseous medium is air, water vapor, or carbon dioxide.

4. The process according to claim 1 wherein the fluid energy mill is operated at a temperature of about 700 to 900° F.

References Cited

UNITED STATES PATENTS

| | | | |
|---|---|---|---|
| 1,652,119 | 12/1927 | Halvorsen | 23—142 |
| 2,431,370 | 11/1947 | Chirnside et al. | 23—142 |
| 2,642,337 | 6/1953 | Newsome | 23—142 |
| 2,726,813 | 12/1955 | Asdell | 241—5 |
| 2,800,518 | 7/1957 | Pitzer | 23—141 X |
| 2,856,268 | 10/1958 | Young | 23—143 X |
| 3,317,145 | 5/1967 | Stephanoff | 241—5 |
| 3,456,887 | 7/1969 | Stephanoff | 241—39 |
| 3,468,625 | 9/1969 | Nightingale, Jr. | 23—143 |
| 2,801,901 | 8/1957 | Dingman et al. | 23—142 |

OSCAR R. VERTIZ, Primary Examiner

G. O. PETERS, Assistant Examiner

U.S. Cl. X.R.

23—305; 241—5